(12) United States Patent
Yang

(10) Patent No.: US 11,189,239 B2
(45) Date of Patent: Nov. 30, 2021

(54) DRIVING METHOD OF DISPLAY PANEL AND DISPLAY DEVICE

(71) Applicant: WUHAN CHINA STAR OPTOELECTRONICS TECHNOLOGY CO., LTD, Hubei (CN)

(72) Inventor: Yong Yang, Hubei (CN)

(73) Assignee: Wuhan China Star Optoelectronics Technology Co., Ltd., Hubei (CN)

( * ) Notice: Subject to any disclaimer, the term of this patent is extended or adjusted under 35 U.S.C. 154(b) by 0 days.

(21) Appl. No.: 16/772,845

(22) PCT Filed: Feb. 25, 2020

(86) PCT No.: PCT/CN2020/076546
§ 371 (c)(1),
(2) Date: Jun. 15, 2020

(87) PCT Pub. No.: WO2021/027270
PCT Pub. Date: Feb. 18, 2021

(65) Prior Publication Data
US 2021/0264864 A1    Aug. 26, 2021

(51) Int. Cl.
G09G 3/36 (2006.01)
G02F 1/1335 (2006.01)
G02F 1/13357 (2006.01)

(52) U.S. Cl.
CPC ..... *G09G 3/3607* (2013.01); *G02F 1/133514* (2013.01); *G02F 1/133603* (2013.01); *G09G 2320/0233* (2013.01)

(58) Field of Classification Search
CPC .......... G09G 3/3607; G09G 2320/0233; G02F 1/133514; G02F 1/133603
See application file for complete search history.

(56) References Cited

U.S. PATENT DOCUMENTS

| | | |
|---|---|---|
| 7,336,277 B1 | 2/2008 | Clark et al. |
| 2009/0073080 A1 | 3/2009 | Meersman et al. |
| 2010/0053450 A1 | 3/2010 | Hanamura et al. |
| 2018/0018770 A1* | 1/2018 | Hu ............................ G06T 7/97 |

FOREIGN PATENT DOCUMENTS

| | | |
|---|---|---|
| CN | 101573742 A | 11/2009 |
| CN | 103578429 A | 2/2014 |
| CN | 104915922 A | 9/2015 |
| CN | 104916256 A | 9/2015 |
| CN | 107742511 A | 2/2018 |

* cited by examiner

*Primary Examiner* — Kenneth B Lee, Jr.
(74) *Attorney, Agent, or Firm* — Mark M. Friedman

(57) ABSTRACT

A driving method of a display panel and a display device are provided, wherein the driving method of the display panel can make a sub-pixel to be driven disposed in a splicing region display normally by compensating the sub-pixel to be driven disposed in the splicing region. A dark line appearing in the splicing region is eliminated, and a technical problem of splicing dark line appearing in the splicing region of a display device adopting spliced mini-LEDs is alleviated.

18 Claims, 2 Drawing Sheets

DRIVING METHOD OF DISPLAY PANEL AND DISPLAY DEVICE

BACKGROUND

This application claims the benefit and priority of Chinese Patent Application No. 201910747304.7, filed Aug. 14, 2019, and entitled "Driving Method of Display Panel and Display Device". The entire disclosures of the above application are incorporated herein by reference.

FIELD OF INVENTION

The present disclosure relates to the field of display technology, and more particularly, to a driving method of a display panel and a display device.

DESCRIPTION OF THE PRIOR ART

Present mini light-emitting diodes (mini-LEDs) are widely used as direct backlights due to advantages of high brightness, high contrast, local dimming, flexibility, and narrow bezels. However, as sizes of display devices are increasing, spliced mini-LEDs are required as backlights. For spliced mini-LEDs, an obvious splicing gap appears in a splicing site of the mini-LEDs, which causes a splicing dark line in the splicing site that affects display effect when a display device displays.

Therefore, present display devices adopting spliced mini-LEDs have a technical problem of splicing dark line appearing in the splicing site.

SUMMARY

The present disclosure provides a driving method of a display panel and a display device to solve a technical problem that a splicing dark line appears in a splicing region of a display device adopting spliced mini-LEDs.

To solve the problem above, the present disclosure provides technical solutions as follows:

The present disclosure provides a driving method of a display panel, including steps of:

obtaining a first driving gray scale of a sub-pixel to be driven;

determining a location of the sub-pixel to be driven, and obtaining a splicing region compensation factor when the sub-pixel to be driven is disposed in a splicing region;

calculating a second driving gray scale of the sub-pixel to be driven according to the splicing region compensation factor; and driving the sub-pixel to be driven by the second driving gray scale.

According to some embodiments, the step of obtaining a splicing region compensation factor includes:

determining a second compensation driving gray scale of a second sub-pixel to be driven disposed in the splicing region by adopting a first formula $G2'=G3+L_1^2/L^2*|G3-G1|$, wherein G2' is the second compensation driving gray scale of the second sub-pixel to be driven disposed in the splicing region, G3 is a third compensation driving gray scale of a third sub-pixel to be driven disposed in a third light source region, G1 is a first compensation driving gray scale of a first sub-pixel to be driven disposed in a first light source region, $L_1$ is a distance between the second sub-pixel to be driven and the third sub-pixel to be driven, and L is a distance between the first sub-pixel to be driven and the third sub-pixel to be driven;

obtaining a second actual driving gray scale G2 of the second sub-pixel to be driven in the splicing region; and determining the splicing region compensation factor by adopting the second actual driving gray scale G2 and the second compensation driving gray scale G2', wherein the splicing region compensation factor $K=G2'/G2$.

According to some embodiments, the step of determining a second compensation driving gray scale of a second sub-pixel to be driven disposed in the splicing region by adopting a first formula $G2'=G3+L_1^2/L^2*|G3-G1|$ includes:

obtaining the third compensation driving gray scale G3 of the third sub-pixel to be driven disposed in the third light source region;

obtaining the first compensation driving gray scale G1 of the first sub-pixel to be driven disposed in the first light source region;

obtaining the distance $L_1$ between the second sub-pixel to be driven and the third sub-pixel to be driven;

obtaining the distance L between the first sub-pixel to be driven and the third sub-pixel to be driven; and obtaining the first formula $G2'=G3+L_1^2/L^2*|G3-G1|$.

According to some embodiments, the step of determining a location of the sub-pixel to be driven, and obtaining a splicing region compensation factor when the sub-pixel to be driven is disposed in the splicing region includes:

determining a second compensation driving gray scale of a second sub-pixel to be driven disposed in the splicing region by adopting a second formula $G2'=G1+L_2^2/L^2*|G3-G1|$, wherein G2' is the second compensation driving gray scale of the second sub-pixel to be driven disposed in the splicing region, G3 is a third compensation driving gray scale of a third sub-pixel to be driven disposed in a third light source region, G1 is a first compensation driving gray scale of a first sub-pixel to be driven disposed in a first light source region, $L_2$ is a distance between the second sub-pixel to be driven and the first sub-pixel to be driven, and L is a distance between the first sub-pixel to be driven and the third sub-pixel to be driven;

obtaining a second actual driving gray scale G2 of the second sub-pixel to be driven disposed in the splicing region; and determining the splicing region compensation factor by adopting the second actual driving gray scale G2 and the second compensation driving gray scale G2', wherein the splicing region compensation factor $K=G2'/G2$.

According to some embodiments, the step of determining a second compensation driving gray scale of a second sub-pixel to be driven disposed in the splicing region by adopting a second formula $G2'=G1+L2^2/L^2*|G3-G1|$ includes:

obtaining the third compensation driving gray scale G3 of the third sub-pixel to be driven disposed in the third light source region;

obtaining the first compensation driving gray scale G1 of the first sub-pixel to be driven disposed in the first light source region;

obtaining the distance $L_2$ between the second sub-pixel to be driven and the first sub-pixel to be driven;

obtaining the distance L between the first sub-pixel to be driven and the third sub-pixel to be driven; and obtaining the second formula $G2'=G1+L_2^2/L^2*|G3-G1|$.

According to some embodiments, the step of obtaining the third compensation driving gray scale G3 of the third sub-pixel to be driven disposed in the third light source region includes:

obtaining a third actual driving gray scale of the third sub-pixel to be driven disposed in the third light source region;

obtaining a third compensation parameter of the third sub-pixel to be driven; and determining the third compensation driving gray scale according to the third actual driving gray scale and the third compensation parameter.

According to some embodiments, the step of obtaining the first compensation driving gray scale G1 of the first sub-pixel to be driven disposed in the first light source region includes:

obtaining a first actual driving gray scale of the first sub-pixel to be driven disposed in the first light source region; and obtaining a first compensation parameter of the first sub-pixel to be driven; and determining the first compensation driving gray scale according to the first actual driving gray scale and the first compensation parameter.

According to some embodiments, the step of obtaining a splicing region compensation factor includes:

determining a first splicing region compensation factor according to a first sub-pixel to be driven disposed in a first light source region;

determining a second splicing region compensation factor according to a third sub-pixel to be driven disposed in a third light source region; and determining the splicing region compensation factor according to the first splicing region compensation factor and the second splicing region compensation factor.

According to some embodiments, the step of calculating a second driving gray scale of the sub-pixel to be driven according to the splicing region compensation factor includes:

obtaining the second driving gray scale according a product of the first driving gray scale of the sub-pixel to be driven and the splicing region compensation factor.

According to some embodiments, the step of obtaining a first driving gray scale of a sub-pixel to be driven includes:

obtaining a third driving gray scale of a driving pixel.

According to some embodiments, the step of determining a location of the sub-pixel to be driven, and obtaining a splicing region compensation factor when the sub-pixel to be driven is disposed in a splicing region includes:

determining a location of the driving pixel, and obtaining the splicing region compensation factor when the driving pixel is disposed in the splicing region.

According to some embodiments, the step of calculating a second driving gray scale of the sub-pixel to be driven according to the splicing region compensation factor includes:

determining a fourth driving gray scale of the driving pixel according to the splicing region compensation factor.

According to some embodiments, the step of driving the sub-pixel to be driven by the second driving gray scale includes:

driving the driving pixel by the fourth driving gray scale.

According to some embodiments, the step of obtaining a splicing region compensation factor includes:

determining a second compensation driving gray scale of a second sub-pixel to be driven disposed in the splicing region by adopting a first formula $G2'=G3+L_1^2/L^2*|G3-G1|$, wherein $G2'$ is the second compensation driving gray scale of the second sub-pixel to be driven disposed in the splicing region, $G3$ is a third compensation driving gray scale of a third sub-pixel to be driven disposed in a third light source region, $G1$ is a first compensation driving gray scale of a first sub-pixel to be driven disposed in a first light source region, $L_1$ is a distance between the second sub-pixel to be driven and the third sub-pixel to be driven, and $L$ is a distance between the first sub-pixel to be driven and the third sub-pixel to be driven;

obtaining a second actual driving gray scale $G2$ of the second sub-pixel to be driven disposed in the splicing region; and determining the splicing region compensation factor by adopting the second actual driving gray scale $G2$ and the second compensation driving gray scale $G2'$, wherein the splicing region compensation factor $K=G2'/G2$.

According to some embodiments, the step of determining a second compensation driving gray scale of a second sub-pixel to be driven disposed in the splicing region by adopting a first formula $G2'=G3+L_1^2/L^2*|G3-G1|$ includes:

obtaining the third compensation driving gray scale $G3$ of the third sub-pixel to be driven disposed in the third light source region;

obtaining the first compensation driving gray scale $G1$ of the first sub-pixel to be driven disposed in the first light source region;

obtaining the distance $L_1$ between the second sub-pixel to be driven and the third sub-pixel to be driven;

obtaining the distance $L$ between the first sub-pixel to be driven and the third sub-pixel to be driven; and obtaining the first formula $G2'=G3+L_1^2/L^2*|G3-G1|$.

According to some embodiments, the step of determining a location of the sub-pixel to be driven, and obtaining a splicing region compensation factor when the sub-pixel to be driven is disposed in the splicing region includes:

determining a second compensation driving gray scale of a second sub-pixel to be driven disposed in the splicing region by adopting a second formula $G2'=G1+L_2^2/L^2*|G3-G1|$, wherein $G2'$ is the second compensation driving gray scale of the second sub-pixel to be driven disposed in the splicing region, $G3$ is a third compensation driving gray scale of a third sub-pixel to be driven disposed in a third light source region, $G1$ is a first compensation driving gray scale of a first sub-pixel to be driven disposed in a first light source region, $L_2$ is a distance between the second sub-pixel to be driven and the first sub-pixel to be driven, and $L$ is a distance between the first sub-pixel to be driven and the third sub-pixel to be driven;

obtaining a second actual driving gray scale $G2$ of the second sub-pixel to be driven disposed in the splicing region; and determining the splicing region compensation factor by adopting the second actual driving gray scale $G2$ and the second compensation driving gray scale $G2'$, wherein the splicing region compensation factor $K=G2'/G2$.

According to some embodiments, the step of determining a second compensation driving gray scale of a second sub-pixel to be driven disposed in the splicing region by adopting a second formula $G2'=G1+L2^2/L^2*|G3-G1|$ includes:

obtaining the third compensation driving gray scale $G3$ of the third sub-pixel to be driven disposed in the third light source region;

obtaining the first compensation driving gray scale $G1$ of the first sub-pixel to be driven disposed in the first light source region;

obtaining the distance $L_2$ between the second sub-pixel to be driven and the first sub-pixel to be driven;

obtaining the distance $L$ between the first sub-pixel to be driven and the third sub-pixel to be driven; and obtaining the second formula $G2'=G1+L_2^2/L^2*|G3-G1|$.

According to some embodiments, the step of obtaining the third compensation driving gray scale G3 of the third sub-pixel to be driven disposed in the third light source region includes:

obtaining a third actual driving gray scale of the third sub-pixel to be driven disposed in the third light source region;

obtaining a third compensation parameter of the third sub-pixel to be driven; and determining the third compensation driving gray scale according to the third actual driving gray scale and the third compensation parameter.

According to some embodiments, the step of obtaining the first compensation driving gray scale G1 of the first sub-pixel to be driven disposed in the first light source region includes:

obtaining a first actual driving gray scale of the first sub-pixel to be driven disposed in the first light source region;

obtaining a first compensation parameter of the first sub-pixel to be driven; and determining the first compensation driving gray scale according to the first actual driving gray scale and the first compensation parameter.

At the same time, the present disclosure provides a display device, including:

a display panel;

a driving integrated circuit, configured to execute the driving method of a display panel as claimed above to drive the display panel.

The present disclosure provides a driving method of a display panel and a display device. The driving method of the display panel includes steps of: obtaining a first driving gray scale of a sub-pixel to be driven; determining a location of the sub-pixel to be driven, and obtaining a splicing region compensation factor when the sub-pixel to be driven is disposed in a splicing region; calculating a second driving gray scale of the sub-pixel to be driven according to the splicing region compensation factor; and driving the sub-pixel to be driven by the second driving gray scale. Compensating the sub-pixel to be driven disposed in the splicing region can make the sub-pixel to be driven disposed in the splicing region display normally, thereby eliminating a display dark line of the splicing region and solving the technical problem of the splicing dark line appearing in the splicing region of the display device adopting spliced mini-LEDs.

DETAILED DESCRIPTION OF PREFERRED EMBODIMENTS

The present disclosure provides a driving method of a display panel, and a display device. In order to make the objects, technical solutions and effects of the present application more clear and definite. The present disclosure will be further described in detail below with reference to the accompanying drawings. It is understood that the specific embodiments described herein are merely illustrative of the application and are not intended to be limited.

For a technical problem of a splicing dark line appearing in a splicing region of a display device adopting spliced mini-LEDs, embodiments of the present disclosure are used to solve the technical problem.

Figure 1:
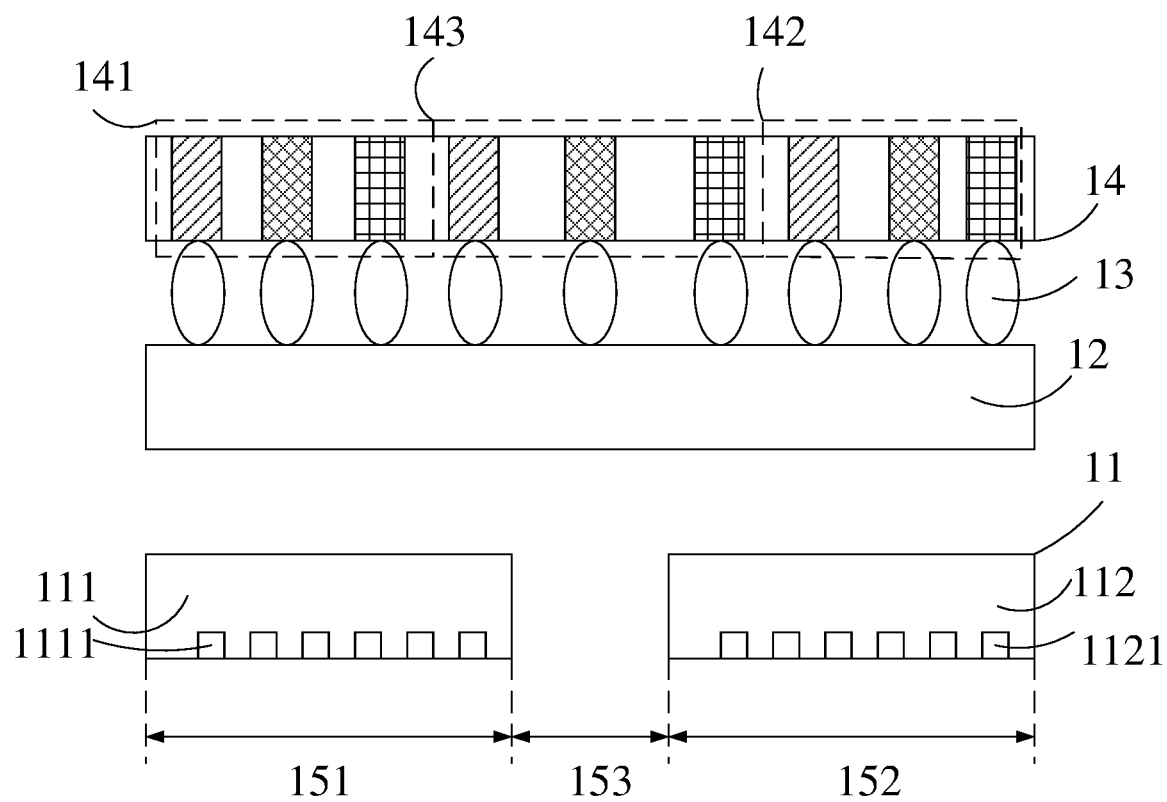
FIG. 1 is a structural diagram of a present display device.

As shown in FIG. 1, a present display device includes a backlight module 11, an array substrate 12, a liquid crystal layer 13, and a color filter 14. The backlight module 11 includes a first light source 111 and a third light source 112. The first light source 111 includes a plurality of mini-LEDs 1111. The third light source 112 includes a plurality of mini-LEDs 1121. The first light source 111 and the third light source 112 are spliced together, wherein a splicing method is based on glue, hinges, and other methods according to actual situations, and connection members in the splicing region are not shown in FIG. 1. The display panel includes a first light source region 151, a third light source region 152, and a splicing region 153 disposed between the first light source region 151 and the third light source region 152. A color resistance layer 141 of a first pixel disposed in the first light source region 151, a color resistance layer 142 of a third pixel disposed in the third light source region 152, and a color resistance layer 143 of a second pixel disposed in the splicing region 153 are shown in FIG. 1. As shown in FIG. 1, because there is no light source in the splicing region 153, the second pixel disposed in the splicing region 153 emits lights through diffused lights of the first light source 111 and the third light source 112, thereby causing the second pixel to be darker or even not emit light, and making a dark line appear in the splicing region 153 when displaying. That is, the present display device adopting spliced mini-LEDs have the technical problem of the splicing dark line appearing in the splicing region.

Figure 2:
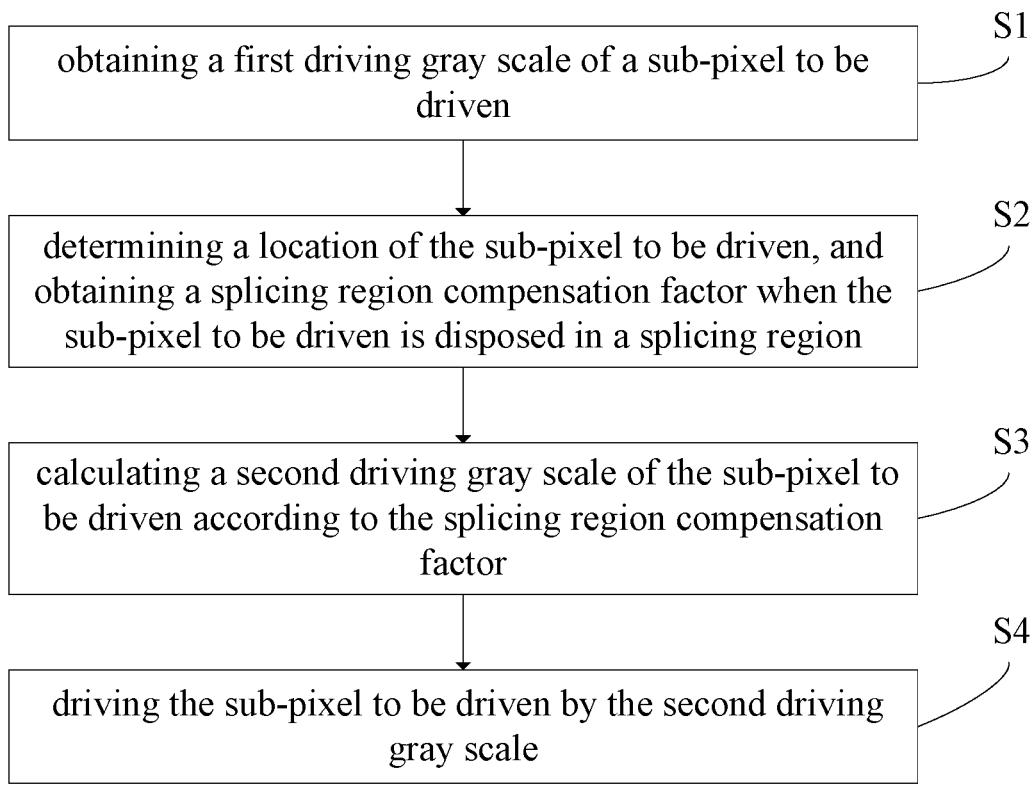
FIG. 2 is a schematic diagram of a driving method of a display panel according to an embodiment of the present disclosure.

As shown in FIG. 2, an embodiment of the present disclosure provides a driving method of a display panel. The driving method of the display panel includes steps of:

S1, obtaining a first driving gray scale of a sub-pixel to be driven.

S2, determining a location of the sub-pixel to be driven, and obtaining a splicing region compensation factor when the sub-pixel to be driven is disposed in a splicing region.

S3, calculating a second driving gray scale of the sub-pixel to be driven according to the splicing region compensation factor.

S4, driving the sub-pixel to be driven by the second driving gray scale.

The present disclosure provides the driving method of the display panel. The driving method of the display panel includes steps of: obtaining a first driving gray scale of a sub-pixel to be driven; determining a location of the sub-pixel to be driven, and obtaining a splicing region compensation factor when the sub-pixel to be driven is disposed in a splicing region; calculating a second driving gray scale of the sub-pixel to be driven according to the splicing region compensation factor; and driving the sub-pixel to be driven by the second driving gray scale. The sub-pixel to be driven of the splicing region can display normally by compensating the sub-pixel to be driven of the splicing region, thereby eliminating a display dark line of a splicing area and solving the technical problem of a splicing dark line appearing in a splicing region of a display device adopting spliced mini-LEDs.

According to one embodiment, the step of obtaining a splicing region compensation factor includes: determining a second compensation driving gray scale of a second sub-pixel to be driven disposed in the splicing region by adopting a first formula $G2'=G3+L_1^2/L^2*|G3-G1|$, wherein G2' is the second compensation driving gray scale of the second sub-pixel to be driven disposed in the splicing region, G3 is a third compensation driving gray scale of a third sub-pixel to be driven disposed in a third light source region, G1 is a first compensation driving gray scale of a first sub-pixel to be driven disposed in a first light source region, $L_1$ is a distance between the second sub-pixel to be driven and the third sub-pixel to be driven, and L is a distance between the first sub-pixel to be driven and the third sub-pixel to be driven; obtaining a second actual driving gray scale G2 of the second sub-pixel to be driven in the splicing region; and determining the splicing region compensation factor by adopting the second actual driving gray scale G2 and the second compensation driving gray scale G2', wherein the splicing region compensation factor K=G2'/G2.

A compensation factor needs to be obtained when obtaining the splicing region compensation factor. The second compensation driving gray scale of the second sub-pixel to be driven disposed in the splicing region is calculated by adopting the first formula. And then, the splicing region compensation factor is obtained by adopting the second actual driving gray scale and the second compensation driving gray scale. Wherein, the first formula takes the first compensation driving gray scale of the first sub-pixel to be driven disposed in the first light source region, the third compensation driving gray scale of the third sub-pixel to be driven disposed in the third light source region, the distance between the first sub-pixel to be driven and the third sub-pixel to be driven, and the distance between the second sub-pixel to be driven and the third sub-pixel to be driven into account. That is, the splicing region compensation factor finally obtained not only takes driving gray scales of the first sub-pixel to be driven and the third sub-pixel to be driven into account, but also distances between each sub-pixel, thereby making corresponding driving gray scale and the splicing region compensation factor take driving gray scales of the first sub-pixel to be driven and the third sub-pixel to be driven into account. Therefore, the splicing region compensation factor and the second compensation driving gray scale are more accurate, and the splicing region has a similar display effect as the light source region to prevent an occurrence of a dark line.

It should be noted that the splicing region is disposed between the first light source region and the third light source region. The first sub-pixel to be driven is a sub-pixel to be driven closest to the splicing region, and the third sub-pixel to be driven is a sub-pixel to be driven closest to the splicing region, respectively. However, the disclosure is not limited to above, and the first sub-pixel to be driven and the third sub-pixel to be driven can be other sub-pixels to be driven.

According to one embodiment, the step of determining a second compensation driving gray scale of a second sub-pixel to be driven disposed in the splicing region by adopting a first formula G2'=G3+$L_1^2$/$L^2$*|G3−G1| includes: obtaining the third compensation driving gray scale G3 of the third sub-pixel to be driven disposed in the third light source region; obtaining the first compensation driving gray scale G1 of the first sub-pixel to be driven disposed in the first light source region; obtaining the distance $L_1$ between the second sub-pixel to be driven and the third sub-pixel to be driven; obtaining the distance L between the first sub-pixel to be driven and the third sub-pixel to be driven; and obtaining the first formula G2'=G3+$L_1^2$/$L^2$*|G3−G1|.

To obtain the first formula, the third compensation driving gray scale G3 of the third sub-pixel to be driven disposed in the third light source region, the first compensation driving gray scale G1 of the first sub-pixel to be driven disposed in the first light source region, the distance $L_1$ between the second sub-pixel to be driven and the third sub-pixel to be driven, and the distance L between the first sub-pixel to be driven and the third sub-pixel to be driven corresponding to any time period should be obtained first. After testing, the splicing region has a similar display effect as light source regions when obtaining the second compensation driving gray scale G2' of the second sub-pixel to be driven according to G3+$L_1^2$/$L^2$*|G3−G1|. Thus, the first formula G2'=G3+$L_1^2$/$L^2$*|G3−G1| is obtained.

According to one embodiment, the step of determining a location of the sub-pixel to be driven, and obtaining a splicing region compensation factor when the sub-pixel to be driven is disposed in the splicing region includes: determining a second compensation driving gray scale of a second sub-pixel to be driven disposed in the splicing region by adopting a second formula G2'=G1+$L_2^2$/$L^2$*|G3−G1|, wherein G2' is the second compensation driving gray scale of the second sub-pixel to be driven disposed in the splicing region, G3 is a third compensation driving gray scale of a third sub-pixel to be driven disposed in a third light source region, G1 is a first compensation driving gray scale of a first sub-pixel to be driven disposed in a first light source region, $L_2$ is a distance between the second sub-pixel to be driven and the first sub-pixel to be driven, and L is a distance between the first sub-pixel to be driven and the third sub-pixel to be driven; obtaining a second actual driving gray scale G2 of the second sub-pixel to be driven disposed in the splicing region; and determining the splicing region compensation factor by adopting the second actual driving gray scale G2 and the second compensation driving gray scale G2', wherein the splicing region compensation factor K=G2'/G2.

A compensation factor needs to be obtained when obtaining the splicing region compensation factor. The second compensation driving gray scale of the second sub-pixel to be driven disposed in the splicing region is calculated by adopting the second formula. And then, the splicing region compensation factor is obtained by adopting the second actual driving gray scale and the second compensation driving gray scale. Wherein, the second formula takes the first compensation driving gray scale of the first sub-pixel to be driven disposed in the first light source region, the third compensation driving gray scale of the third sub-pixel to be driven disposed in the third light source region, the distance between the first sub-pixel to be driven and the third sub-pixel to be driven, and the distance between the second sub-pixel to be driven and the first sub-pixel to be driven into account. That is, the first sub-pixel to be driven is taken as a main factor, and the second sub-pixel to be driven and the third sub-pixel to be driven are also considered, making the second compensation driving gray scale of the second sub-pixel to be driven relate to the first compensation driving gray scale of the first sub-pixel to be driven and the third compensation driving gray scale of the third sub-pixel to be driven, and making the second sub-pixel to be driven have a similar display effect as the first sub-pixel to be driven and the third sub-pixel to be driven to prevent an occurrence of a dark line.

According to one embodiment, the step of determining a second compensation driving gray scale of a second sub-pixel to be driven disposed in the splicing region by adopting a second formula G2'=G1+$L_2^2$/$L^2$*|G3−G1| comprises: obtaining the third compensation driving gray scale G3 of the third sub-pixel to be driven disposed in the third light source region; obtaining the first compensation driving gray scale G1 of the first sub-pixel to be driven disposed in the first light source region; obtaining the distance $L_2$ between the second sub-pixel to be driven and the first sub-pixel to be driven; obtaining the distance L between the first sub-pixel to be driven and the third sub-pixel to be driven; and obtaining the second formula $G2'=G1+L_2^2/L^2*|G3-G1|$.

To obtain the second formula, the third compensation driving gray scale G3 of the third sub-pixel to be driven disposed in the third light source region, the first compensation driving gray scale G1 of the first sub-pixel to be driven disposed in the first light source region, the distance $L_2$ between the second sub-pixel to be driven and the first sub-pixel to be driven, and the distance L between the first sub-pixel to be driven and the third sub-pixel to be driven corresponding to any time period are obtained, so that the second compensation driving gray scale according to the second formula is related to the first compensation driving gray scale and the third compensation driving gray scale, and the second sub-pixel to be driven has a similar display effect as the first sub-pixel to be driven and the third sub-pixel to be driven. After obtaining relevant parameters of the first sub-pixel to be driven and the third sub-pixel to be driven, it can be learned through testing that a display effect of the splicing region is the same as that of the light source region when the second compensation driving gray scale of the second sub-pixel to be driven is obtained according to $G1+L_2^2/L^2*|G3-G1|$, so that the second formula $G2'=G1+L_2^2/L^2*|G3-G1|$ is obtained.

According to one embodiment, the step of obtaining the third compensation driving gray scale G3 of the third sub-pixel to be driven disposed in the third light source region includes: obtaining a third actual driving gray scale of the third sub-pixel to be driven disposed in the third light source region; obtaining a third compensation parameter of the third sub-pixel to be driven; and determining the third compensation driving gray scale according to the third actual driving gray scale and the third compensation parameter.

When obtaining the third driving compensation gray scale of the third sub-pixel to be driven, the third actual driving gray scale which is an actual driving gray scale of the third sub-pixel to be driven should be obtained first. And then, the third compensation parameter of the third sub-pixel to be driven is obtained. Wherein, the third compensation parameter is configured to compensate a gray scale loss caused by a circuit loss during a driving process of the third sub-pixel to be driven. The third compensation driving gray scale is obtained according to the third actual driving gray scale and the third compensation parameter. That is, a driving gray scale making the third sub-pixel have a best display effect is obtained.

According to one embodiment, the step of obtaining the first compensation driving gray scale G1 of the first sub-pixel to be driven disposed in the first light source region includes: obtaining a first actual driving gray scale of the first sub-pixel to be driven disposed in the first light source region; obtaining a first compensation parameter of the first sub-pixel to be driven; and determining the first compensation driving gray scale according to the first actual driving gray scale and the first compensation parameter.

The first actual driving gray scale of the first sub-pixel to be driven should be obtained first when obtaining the first compensation driving gray scale of the first sub-pixel to be driven. And then, the first compensation driving gray scale making the first sub-pixel to be driven display normally is obtained according to the first compensation parameter of corresponding first sub-pixel to be driven.

According to one embodiment, the step of obtaining a splicing region compensation factor includes: determining a first splicing region compensation factor according to a first sub-pixel to be driven disposed in a first light source region; determining a second splicing region compensation factor according to a third sub-pixel to be driven disposed in a third light source region; and determining the splicing region compensation factor according to the first splicing region compensation factor and the second splicing region compensation factor.

When obtaining the splicing region compensation factor, the first splicing region compensation factor can be determined based on the first sub-pixel to be driven, and the second splicing region compensation factor can be determined based on the third sub-pixel to be driven. And then, the splicing region compensation factor is determined according to the first splicing region compensation factor and the second splicing region compensation factor. The obtained splicing region compensation factor takes in account the first sub-pixel to be driven and the third sub-pixel to be driven, thereby obtaining a more accurate splicing region compensation factor.

According to one embodiment, the step of calculating a second driving gray scale of the sub-pixel to be driven according to the splicing region compensation factor includes: obtaining the second driving gray scale according a product of the first driving gray scale of the sub-pixel to be driven and the splicing region compensation factor. In actual driving, the first driving gray scale of the sub-pixel to be driven is multiplied with the splicing region compensation factor to obtain the second driving gray scale, thereby compensating the sub-pixel to be driven disposed in the splicing region and making the sub-pixel to be driven disposed in the splicing region display normally.

In the embodiments above, when compensating the sub-pixels to be driven disposed in the splicing region, the compensation factors of each sub-pixel are calculated separately. Each sub-pixel is compensated according to the compensation factor of each sub-pixel, so that each sub-pixel in the splicing region displays normally and eliminates the splicing dark line.

According to one embodiment, the step of obtaining a first driving gray scale of a sub-pixel to be driven includes: obtaining a third driving gray scale of a driving pixel.

According to one embodiment, the step of determining a location of the sub-pixel to be driven, and obtaining a splicing region compensation factor when the sub-pixel to be driven is disposed in a splicing region includes: determining a location of the driving pixel, and obtaining the splicing region compensation factor when the driving pixel is disposed in the splicing region.

According to one embodiment, the step of calculating a second driving gray scale of the sub-pixel to be driven according to the splicing region compensation factor includes: determining a fourth driving gray scale of the driving pixel according to the splicing region compensation factor.

According to one embodiment, the step of driving the sub-pixel to be driven by the second driving gray scale includes: driving the driving pixel by the fourth driving gray scale.

According to one embodiment, the step of obtaining a splicing region compensation factor includes: determining a second compensation driving gray scale of a second sub-pixel to be driven disposed in the splicing region by adopting a first formula $G2'=G3+L_1^2/L^2*|G3-G1|$, wherein G2' is the second compensation driving gray scale of the second sub-pixel to be driven disposed in the splicing region, G3 is a third compensation driving gray scale of a third sub-pixel to be driven disposed in a third light source region, G1 is a first compensation driving gray scale of a first sub-pixel to be driven disposed in a first light source region, $L_1$ is a distance between the second sub-pixel to be driven and the third sub-pixel to be driven, and L is a distance between the first sub-pixel to be driven and the third sub-pixel to be driven; obtaining a second actual driving gray scale G2 of the second sub-pixel to be driven disposed in the splicing region; and determining the splicing region compensation factor by adopting the second actual driving gray scale G2 and the second compensation driving gray scale G2', wherein the splicing region compensation factor K=G2'/G2.

According to one embodiment, the step of determining a second compensation driving gray scale of a second sub-pixel to be driven disposed in the splicing region by adopting a first formula $G2'=G3+L_1^2/L^2*|G3-G1|$ includes: obtaining the third compensation driving gray scale G3 of the third sub-pixel to be driven disposed in the third light source region; obtaining the first compensation driving gray scale G1 of the first sub-pixel to be driven disposed in the first light source region; obtaining the distance $L_1$ between the second sub-pixel to be driven and the third sub-pixel to be driven; obtaining the distance L between the first sub-pixel to be driven and the third sub-pixel to be driven; and obtaining the first formula $G2'=G3+L_1^2/L^2*|G3-G1|$.

According to one embodiment, the step of determining a location of the sub-pixel to be driven, and obtaining a splicing region compensation factor when the sub-pixel to be driven is disposed in the splicing region includes: determining a second compensation driving gray scale of a second sub-pixel to be driven disposed in the splicing region by adopting a second formula $G2'=G1+L_2^2/L^2*|G3-G1|$, wherein G2' is the second compensation driving gray scale of the second sub-pixel to be driven disposed in the splicing region, G3 is a third compensation driving gray scale of a third sub-pixel to be driven disposed in a third light source region, G1 is a first compensation driving gray scale of a first sub-pixel to be driven disposed in a first light source region, $L_2$ is a distance between the second sub-pixel to be driven and the first sub-pixel to be driven, and L is a distance between the first sub-pixel to be driven and the third sub-pixel to be driven; obtaining a second actual driving gray scale G2 of the second sub-pixel to be driven disposed in the splicing region; and determining the splicing region compensation factor by adopting the second actual driving gray scale G2 and the second compensation driving gray scale G2', wherein the splicing region compensation factor K=G2'/G2.

According to one embodiment, the step of determining a second compensation driving gray scale of a second sub-pixel to be driven disposed in the splicing region by adopting a second formula $G2'=G1+L_2^2/L^2*|G3-G1|$ includes: obtaining the third compensation driving gray scale G3 of the third sub-pixel to be driven disposed in the third light source region; obtaining the first compensation driving gray scale G1 of the first sub-pixel to be driven disposed in the first light source region; obtaining the distance $L_2$ between the second sub-pixel to be driven and the first sub-pixel to be driven; obtaining the distance L between the first sub-pixel to be driven and the third sub-pixel to be driven; and obtaining the second formula $G2'=G1+L_2^2/L^2*|G3-G1|$.

According to one embodiment, the step of obtaining the third compensation driving gray scale G3 of the third sub-pixel to be driven disposed in the third light source region includes: obtaining a third actual driving gray scale of the third sub-pixel to be driven disposed in the third light source region; obtaining a third compensation parameter of the third sub-pixel to be driven; and determining the third compensation driving gray scale according to the third actual driving gray scale and the third compensation parameter.

According to one embodiment, the step of obtaining the first compensation driving gray scale G1 of the first sub-pixel to be driven disposed in the first light source region includes: obtaining a first actual driving gray scale of the first sub-pixel to be driven disposed in the first light source region; obtaining a first compensation parameter of the first sub-pixel to be driven; and determining the first compensation driving gray scale according to the first actual driving gray scale and the first compensation parameter.

In the embodiments above, when compensating the sub-pixel disposed in the splicing region, a compensation factor of a sub-pixel of a pixel is obtained and is adopted to compensate the pixel. That is, the compensation factors of each sub-pixel of a same pixel are the same. Then, the sub-pixels disposed in the splicing region are compensated and the splicing dark line is eliminated.

According to the embodiments of the present disclosure, when compensating the sub-pixels disposed in the splicing region, not only can compensation factors of each sub-pixel be calculated separately and each sub-pixel disposed in the splicing region can be compensated by corresponding compensation factor of each sub-pixel disposed in the splicing region, but the compensation factors of each sub-pixel of a same pixel can also be disposed the same to compensate each sub-pixel disposed in the splicing region.

The present disclosure provides a display device, wherein the display device includes: a display panel; and a driving integrated circuit, configured to execute the driving method of the display panel according to any embodiment above to drive the display panel.

The present disclosure provides a driving method of a display panel, and a display device. The driving method of the display panel includes steps of: obtaining a first driving gray scale of a sub-pixel to be driven; determining a location of the sub-pixel to be driven, and obtaining a splicing region compensation factor when the sub-pixel to be driven is disposed in a splicing region; calculating a second driving gray scale of the sub-pixel to be driven according to the splicing region compensation factor; and driving the sub-pixel to be driven by the second driving gray scale. A sub-pixel to be driven disposed in a splicing region can display normally by compensating the sub-pixel to be driven disposed in the splicing region. A dark line appearing in the splicing region is eliminated, and the technical problem of splicing dark line appearing in the splicing region of a display device adopting spliced mini-LEDs is alleviated.

The present disclosure is described in detail in accordance with the above contents with the specific preferred examples. However, this present disclosure is not limited to the specific examples. For a person of ordinary skill in the art, on the premise of keeping the conception of the present disclosure, the technical personnel can also make simple deductions or replacements, all of which should be considered to belong to the protection scope of the present disclosure.

What is claimed is:

1. A driving method of a display panel, comprising steps of:

obtaining a first driving gray scale of a sub-pixel to be driven;

determining a location of the sub-pixel to be driven, and obtaining a splicing region compensation factor when the sub-pixel to be driven is disposed in a splicing region;

calculating a second driving gray scale of the sub-pixel to be driven according to the splicing region compensation factor; and driving the sub-pixel to be driven by the second driving gray scale, wherein the step of obtaining the splicing region compensation factor comprises:

determining a second compensation driving gray scale of a second sub-pixel to be driven disposed in the splicing region by adopting a first formula $G2'=G3+L_1^2/L^2*|G3-G1|$, wherein $G2'$ is the second compensation driving gray scale of the second sub-pixel to be driven disposed in the splicing region, G3 is a third compensation driving gray scale of a third sub-pixel to be driven disposed in a third light source region, G1 is a first compensation driving gray scale of a first sub-pixel to be driven disposed in a first light source region, $L_1$ is a distance between the second sub-pixel to be driven and the third sub-pixel to be driven, and L is a distance between the first sub-pixel to be driven and the third sub-pixel to be driven;

obtaining a second actual driving gray scale G2 of the second sub-pixel to be driven in the splicing region; and determining the splicing region compensation factor by adopting the second actual driving gray scale G2 and the second compensation driving gray scale $G2'$, wherein the splicing region compensation factor $K=G2'/G2$.

2. The driving method of the display panel as claimed in claim 1, wherein the step of determining the second compensation driving gray scale of the second sub-pixel to be driven disposed in the splicing region by adopting the first formula $G2'=G3+L_1^2/L^2*|G3-G1|$ comprises:

obtaining the third compensation driving gray scale G3 of the third sub-pixel to be driven disposed in the third light source region;

obtaining the first compensation driving gray scale G1 of the first sub-pixel to be driven disposed in the first light source region;

obtaining the distance $L_1$ between the second sub-pixel to be driven and the third sub-pixel to be driven;

obtaining the distance L between the first sub-pixel to be driven and the third sub-pixel to be driven; and obtaining the first formula $G2'=G3+L_1^2/L^2*|G3-G1|$.

3. The driving method of the display panel as claimed in claim 1, wherein the step of determining the location of the sub-pixel to be driven, and obtaining the splicing region compensation factor when the sub-pixel to be driven is disposed in the splicing region comprises:

determining a second compensation driving gray scale of a second sub-pixel to be driven disposed in the splicing region by adopting a second formula $G2'=G1+L_2^2/L^2*|G3-G1|$, wherein $G2'$ is the second compensation driving gray scale of the second sub-pixel to be driven disposed in the splicing region, G3 is a third compensation driving gray scale of a third sub-pixel to be driven disposed in a third light source region, G1 is a first compensation driving gray scale of a first sub-pixel to be driven disposed in a first light source region, $L_2$ is a distance between the second sub-pixel to be driven and the first sub-pixel to be driven, and L is a distance between the first sub-pixel to be driven and the third sub-pixel to be driven;

obtaining a second actual driving gray scale G2 of the second sub-pixel to be driven disposed in the splicing region; and determining the splicing region compensation factor by adopting the second actual driving gray scale G2 and the second compensation driving gray scale $G2'$, wherein the splicing region compensation factor $K=G2'/G2$.

4. The driving method of the display panel as claimed in claim 3, wherein the step of determining the second compensation driving gray scale of the second sub-pixel to be driven disposed in the splicing region by adopting the second formula $G2'=G1+L_2^2/L^2*|G3-G1|$ comprises:

obtaining the third compensation driving gray scale G3 of the third sub-pixel to be driven disposed in the third light source region;

obtaining the first compensation driving gray scale G1 of the first sub-pixel to be driven disposed in the first light source region;

obtaining the distance $L_2$ between the second sub-pixel to be driven and the first sub-pixel to be driven;

obtaining the distance L between the first sub-pixel to be driven and the third sub-pixel to be driven; and obtaining the second formula $G2'=G1+L_2^2/L^2*|G3-G1|$.

5. The driving method of the display panel as claimed in claim 4, wherein the step of obtaining the third compensation driving gray scale G3 of the third sub-pixel to be driven disposed in the third light source region comprises:

obtaining a third actual driving gray scale of the third sub-pixel to be driven disposed in the third light source region;

obtaining a third compensation parameter of the third sub-pixel to be driven; and determining the third compensation driving gray scale according to the third actual driving gray scale and the third compensation parameter.

6. The driving method of the display panel as claimed in claim 4, wherein the step of obtaining the first compensation driving gray scale G1 of the first sub-pixel to be driven disposed in the first light source region comprises:

obtaining a first actual driving gray scale of the first sub-pixel to be driven disposed in the first light source region;

obtaining a first compensation parameter of the first sub-pixel to be driven; and determining the first compensation driving gray scale according to the first actual driving gray scale and the first compensation parameter.

7. The driving method of the display panel as claimed in claim 1, wherein the step of obtaining the splicing region compensation factor comprises:

determining a first splicing region compensation factor according to a first sub-pixel to be driven disposed in a first light source region;

determining a second splicing region compensation factor according to a third sub-pixel to be driven disposed in a third light source region; and determining the splicing region compensation factor according to the first splicing region compensation factor and the second splicing region compensation factor.

8. The driving method of the display panel as claimed in claim 1, wherein the step of calculating the second driving gray scale of the sub-pixel to be driven according to the splicing region compensation factor comprises:

obtaining the second driving gray scale according a product of the first driving gray scale of the sub-pixel to be driven and the splicing region compensation factor.

9. The driving method of the display panel as claimed in claim 1, wherein the step of obtaining the first driving gray scale of the sub-pixel to be driven comprises:
obtaining a third driving gray scale of a driving pixel.

10. The driving method of the display panel as claimed in claim 9, wherein the step of determining the location of the sub-pixel to be driven, and obtaining the splicing region compensation factor when the sub-pixel to be driven is disposed in the splicing region comprises:
determining a location of the driving pixel, and obtaining the splicing region compensation factor when the driving pixel is disposed in the splicing region.

11. The driving method of the display panel as claimed in claim 10, wherein the step of calculating the second driving gray scale of the sub-pixel to be driven according to the splicing region compensation factor comprises:
determining a fourth driving gray scale of the driving pixel according to the splicing region compensation factor.

12. The driving method of the display panel as claimed in claim 11, wherein the step of driving the sub-pixel to be driven by the second driving gray scale comprises:
driving the driving pixel by the fourth driving gray scale.

13. The driving method of the display panel as claimed in claim 1, wherein the step of determining the second compensation driving gray scale of the second sub-pixel to be driven disposed in the splicing region by adopting the first formula $G2'=G3+L_1^2/L^2*|G3-G1|$ comprises:
obtaining the third compensation driving gray scale G3 of the third sub-pixel to be driven disposed in the third light source region;
obtaining the first compensation driving gray scale G1 of the first sub-pixel to be driven disposed in the first light source region;
obtaining the distance $L_1$ between the second sub-pixel to be driven and the third sub-pixel to be driven;
obtaining the distance L between the first sub-pixel to be driven and the third sub-pixel to be driven; and
obtaining the first formula $G2'=G3+L_1^2/L^2*|G3-G1|$.

14. The driving method of the display panel as claimed in claim 10, wherein the step of determining the location of the sub-pixel to be driven, and obtaining the splicing region compensation factor when the sub-pixel to be driven is disposed in the splicing region comprises:
determining a second compensation driving gray scale of a second sub-pixel to be driven disposed in the splicing region by adopting a second formula $G2'=G1+L_2^2/L^2*|G3-G1|$, wherein G2' is the second compensation driving gray scale of the second sub-pixel to be driven disposed in the splicing region, G3 is a third compensation driving gray scale of a third sub-pixel to be driven disposed in a third light source region, G1 is a first compensation driving gray scale of a first sub-pixel to be driven disposed in a first light source region, $L_2$ is a distance between the second sub-pixel to be driven and the first sub-pixel to be driven, and L is a distance between the first sub-pixel to be driven and the third sub-pixel to be driven;
obtaining a second actual driving gray scale G2 of the second sub-pixel to be driven disposed in the splicing region; and
determining the splicing region compensation factor by adopting the second actual driving gray scale G2 and the second compensation driving gray scale G2', wherein the splicing region compensation factor K=G2'/G2.

15. The driving method of the display panel as claimed in claim 14, wherein the step of determining the second compensation driving gray scale of the second sub-pixel to be driven disposed in the splicing region by adopting the second formula $G2'=G1+L_2^2/L^2*|G3-G1|$ comprises:
obtaining the third compensation driving gray scale G3 of the third sub-pixel to be driven disposed in the third light source region;
obtaining the first compensation driving gray scale G1 of the first sub-pixel to be driven disposed in the first light source region;
obtaining the distance $L_2$ between the second sub-pixel to be driven and the first sub-pixel to be driven;
obtaining the distance L between the first sub-pixel to be driven and the third sub-pixel to be driven; and
obtaining the second formula $G2'=G1+L_2^2/L^2*|G3-G1|$.

16. The driving method of the display panel as claimed in claim 15, wherein the step of obtaining the third compensation driving gray scale G3 of the third sub-pixel to be driven disposed in the third light source region comprises:
obtaining a third actual driving gray scale of the third sub-pixel to be driven disposed in the third light source region;
obtaining a third compensation parameter of the third sub-pixel to be driven; and
determining the third compensation driving gray scale according to the third actual driving gray scale and the third compensation parameter.

17. The driving method of the display panel as claimed in claim 15, wherein the step of obtaining the first compensation driving gray scale G1 of the first sub-pixel to be driven disposed in the first light source region comprises:
obtaining a first actual driving gray scale of the first sub-pixel to be driven disposed in the first light source region;
obtaining a first compensation parameter of the first sub-pixel to be driven; and
determining the first compensation driving gray scale according to the first actual driving gray scale and the first compensation parameter.

18. A display device, comprising:
a display panel; and
a driving integrated circuit, configured to execute the driving method of the display panel as claimed in claim 1 to drive the display panel.

* * * * *

UNITED STATES PATENT AND TRADEMARK OFFICE
CERTIFICATE OF CORRECTION

PATENT NO. : 11,189,239 B2
APPLICATION NO. : 16/772845
DATED : November 30, 2021
INVENTOR(S) : Yong Yang It is certified that error appears in the above-identified patent and that said Letters Patent is hereby corrected as shown below:

On the Title Page

Item (30), add:
Foreign Application Priority Data
Aug. 14, 2019 (CN) ............................ 201910747304.7

Signed and Sealed this
Second Day of August, 2022

Katherine Kelly Vidal
*Director of the United States Patent and Trademark Office*